Oct. 11, 1966 H. G. LEHMANN 3,278,093
METERING AND NON-METERING AEROSOL ACTUATOR BUTTON
Filed Jan. 13, 1964 2 Sheets-Sheet 2
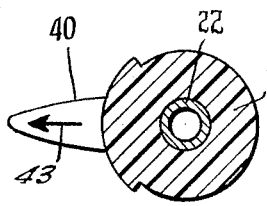
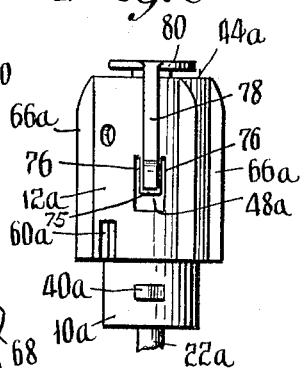
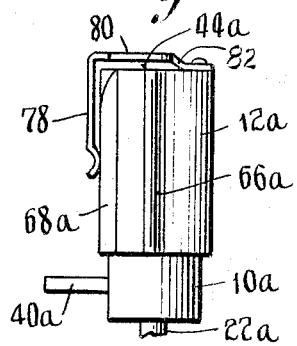
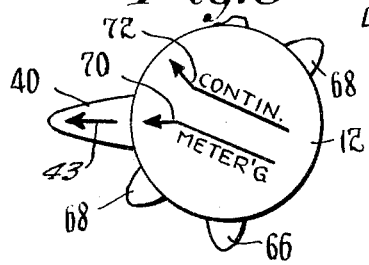
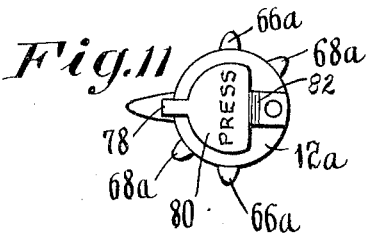
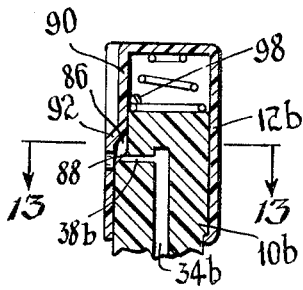
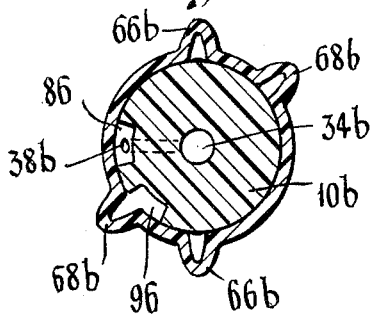
INVENTOR.
Herbert G. Lehmann
BY H. Gibner Lehmann
AGENT United States Patent Office 3,278,093
Patented Oct. 11, 1966

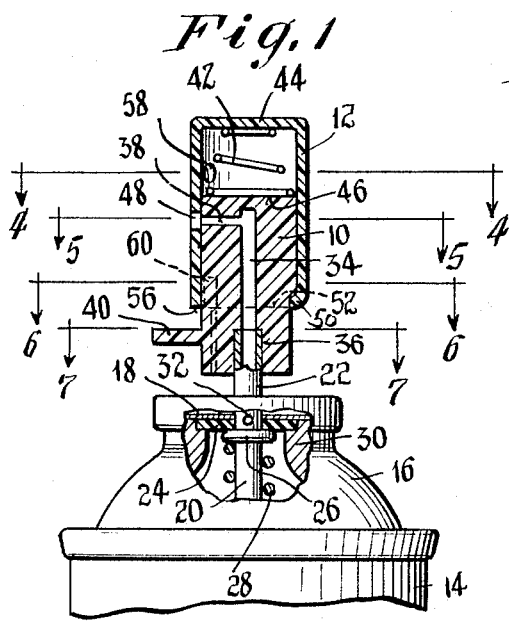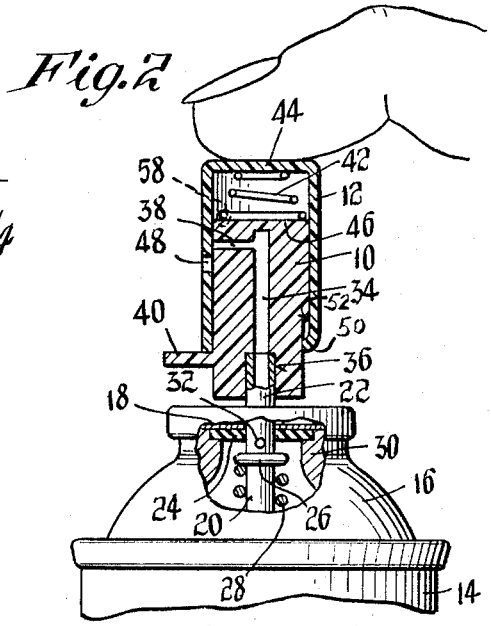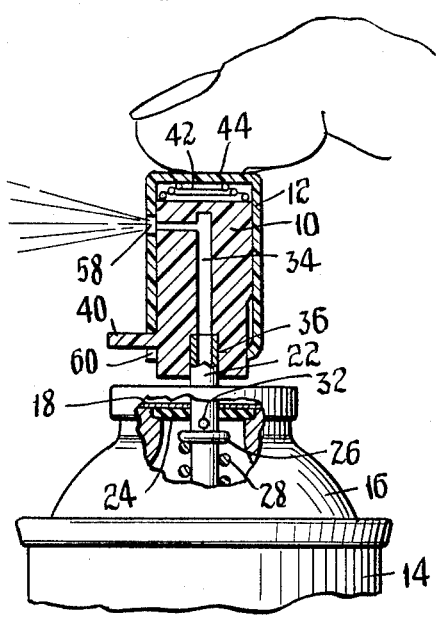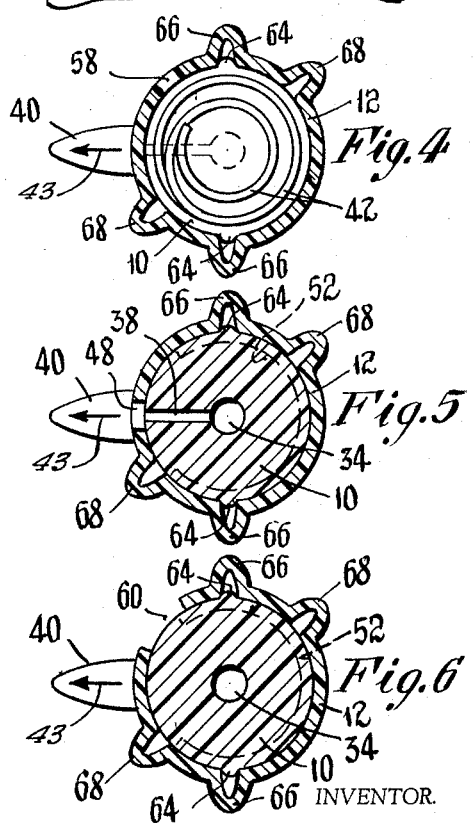

3,278,093
METERING AND NON-METERING AEROSOL ACTUATOR BUTTON
Herbert G. Lehmann, Easton, Conn., assignor to Valve Corporation of America, Bridgeport, Conn., a corporation of Delaware
Filed Jan. 13, 1964, Ser. No. 337,344
12 Claims. (Cl. 222—402.17)

This invention relates to small aerosol dispensing devices of the type intended to be held in the hand when in use, and more particularly to metering and non-metering actuator buttons or caps for such devices.

Prior patents of the metering button type include Patent No. 2,892,576 issued to Lawrence T. Ward on June 30, 1959, and Patent No. 2,989,217 issued to John R. Focht on June 20, 1961. These patents disclose a metering chamber in the button, which is closed off from the discharge passage of the button when the latter is depressed, and which communicates with the said passage when the button is released. The present invention differs from the devices of these patents in that it does not close off the metering chamber from the discharge passage but instead closes the external orifice or mouth of the discharge passage itself and leaves intact the communication between the said passage and the metering chamber.

An object of the invention is to provide a novel and improved, simplified aerosol actuator button of the kind mentioned, which has a positive metering and discharge valve action by which effective and reliable operation is insured at all times.

Another object of the invention is to provide an improved aerosol actuator cap or button as above set forth, wherein the metering and discharge valve is of the slide type and may in its sealing or closing function be either independent of finger pressure or else partly dependent on finger pressure A feature of the invention resides in the provision of an improved metering type aerosol actuator button which is especially foolproof in its operation, and which is not likely to be improperly operated because of ignorance or carelessness on the part of the user.

Still another object of the invention is to provide an improved aerosol actuator button as above characterized, wherein with one and the same structure either a metering discharge or else a non-metering or continuous discharge may be readily obtained at the option of the user, by changing a setting of the button.

Another feature of the invention resides in the provision of an improved metering and non-metering aerosol actuator button which is of especially simple construction, involving a minimum number of parts or components.

Still another feature of the invention resides in the provision of an improved aerosol actuator button in accordance with the foregoing, which is easy and convenient to use, and reliable in its working at all times.

Yet another object of the invention is to provide an improved metering type button as outlined, wherein the mouth of the discharge passage may be effectively closed with a pressure which increases as the finger pressure on the button is increased.

Other features and advantages will hereinafter appear.

In the drawings accompanying this specification, a similar character of reference is used to designate like components throughout the several views, in which:

FIG. 1 is an axial sectional view of an improved metering and non-metering aerosol actuator button made in accordance with the invention, the button being shown in the raised position which may be either operative or inoperative, and being carried by a vertically movable hollow valve stem of a pressurized aerosol dispenser.

FIG. 2 is a view like that of FIG. 1 but showing the button in the depressed position and set to provide, upon its subsequent release, a metered discharge of the aerosol substance.

FIG. 3 is a view like that of FIG. 2 but showing the button in a depressed position and set to provide a non-metering or continuous discharge as long as it is held depressed.

FIG. 4 is a transverse or horizontal section, taken on the line 4—4 of FIG. 1.

FIG. 5 is a transverse or horizontal section, taken on the line 5—5 of FIG. 1.

FIG. 6 is a transverse or horizontal section, taken on the line 6—6 of FIG. 1.

FIG. 7 is a transverse or horizontal section, taken on the line 7—7 of FIG. 1.

FIG. 8 is a top plan view of the actuator button, set in the position for discharging according to FIGS. 1 and 2.

FIG. 9 is a front elevational view of a metering type actuator button as provided by the invention, illustrating another embodiment thereof.

FIG. 10 is a side elevational view of the button of FIG. 9.

FIG. 11 is a top plan view of the button shown in FIGS. 9 and 10.

FIG. 12 is a fragmentary vertical sectional view of an actuator button illustrating yet another modification of the invention.

FIG. 13 is a transverse or horizontal section taken on the line 13—13 of FIG. 12.

As shown, the present improved actuator button comprises essentially two main parts, an inner cap body part 10 and an outer, finger-engageable resilient actuator part or shell 12. The body part 10 and the shell 12 may be formed of any suitable material, such as molded plastic substance, or if desired the shell 12 may be formed as a drawn metal cup.

Referring to FIGS. 1–3 there is illustrated a pressurized aerosol container 14 of conventional type, having an upper closure or neck portion 16 provided with an apertured top wall 18 in which there is vertically movable a valve stem 20 having a tubular upper portion 22. Below the top wall 18 is a valve seat in the form of a washer 24 which is engaged by a valve shoulder 26 on the vertically movable stem 20. A valve return spring 28 surrounds the lower portion of the valve stem 20 and normally maintains the stem in the raised, valve-closing position. A molded valve housing 30 encloses the return spring 28 and the lower stem portion, and provides an abutment (not shown) for the lower end of the return spring. The valve housing 30 also retains in the position shown the valve disk or washer 24. The upper portion 22 of the valve stem 20 has a side opening 32 which communicates with the bore of said upper portion.

All of the above construction is already well known in the art, and it will be understood that when the valve stem 20 is shifted downward from the closed position shown, the valve shoulder 26 will separate from the valve washer or seat 24. Also, the side opening 32 of the stem will be disposed below the valve seat 24 whereby the pressurized contents of the aerosol container may pass through the opening 32 and upward through the bore of the upper portion 22 of the valve stem. When the valve stem 20 is allowed to shift upward to the closing position shown in FIG. 1, no egress of the aerosol substance may occur due to the valve shoulder 26 firmly seating against the valve washer 24 and effectively closing the discharge opening.

In accordance with this invention, a novel actuator button unit is provided, adapted to be frictionally carried by the upper portion 22 of the valve stem to constitute a convenient actuator for the same whereby the stem may be readily depressed or shifted downward when it is desired to effect a discharge of the aerosol substance. The said actuator button or cap is so constituted that at the option of the user, either a metered discharge of the aerosol substance is obtainable or else a non-metered or continuous discharge of such substance. Also, the actuator button is characterized by a positive metering and discharge valve action employing a slide type valve which may either be independent of finger pressure as regards its sealing qualities, or else partly influenced by finger pressure. The actuator button is extremely simple in construction, has relatively few parts, and provides a foolproof metering discharge even though the user is not adept at operating or accustomed to operate aerosol devices.

The body portion 10 of the actuator button has a vertical bore 34 with a lower portion 36 of slightly larger diameter to snugly receive the upper portion 22 of the depressible valve stem. A positioning shoulder is provided in the bores 34, 36 to properly locate the body portion 10 on the valve stem 22.

The body portion 10 of the button also has a transverse discharge passage or channel 38 which communicates with the bore 34, the latter being of larger diameter than the discharge passage and constituting the main part of a metering chamber whereas the discharge passage functions essentially to enable the pressurized contents of the metering chamber to be expelled to the atmosphere.

The body portion 10 also has a pointed finger grip piece 40 which is used when setting the button for either metering or non-metering discharge. The finger piece 40 preferably has an arrow 43 located so as to be plainly in view, said arrow indicating the direction in which the spray will issue from the body portion 10, or more particularly from the discharge passage 38.

The finger engageable shell 12 is so arranged as to constitute a slide valve member, said shell being vertically movable on the body portion 10 and being normally held in a raised position by a spiral coil spring 42. The spring 42 is disposed between the transverse top wall 44 of the shell and the transverse top wall 46 of the body portion 10.

In its side wall, the shell 12 has a valve opening 48 which is adapted to register with the discharge passage 38 when the actuator button is in the raised position free of all external force such as finger pressure, etc. Functioning as a stop to counteract the action of the spring 42 is an inturned bottom edge portion 50 of the shell 12, such bottom edge portion extending circumferentially through an angle somewhat greater than 180° and less than 270°. The inturned shoulder 50 engages the cooperable shoulder 52 provided on the exterior surface of the body portion 10, such cooperable shoulder 52 being obtained by forming the lower part of the body portion 10 to have a slightly reduced diameter through an arc of approximately 270°, as seen in FIG. 7. By such construction, the inturned shoulder 50 on the lower edge of the shell 12 not only functions as a stop to limit the upward movement of the shell on the body portion 10 but it also permits a limited relative turning setting movement of the shell 12 on the body portion, for setting purposes to be later explained in detail.

Considering the button construction as thus far described, it will be evident that finger pressure on the top of the shell 12 as illustrated in FIG. 2 will shift it downward on the body portion 10 until a lower edge portion 56 (FIG. 1) of the shell engages the finger piece 40 of the body portion 10. For such condition, the discharge opening 48 of the shell will be out of registration with the discharge passage 38 of the body portion. Further downward finger pressure will now shift downward the valve stem 20, separating the valve shoulder 26 from the washer 24 and opening the valve whereby aerosol substance may pass upward through the hollow stem portion 22 into the metering chamber 34. Such aerosol substance may not escape from the metering chamber at this time, however, because the discharge passage 38 is closed by the side wall of the shell 12, the latter constituting in effect a slide valve element. It is noted that the spring 42 is made to be appreciably weaker than the valve return spring 28 in the aerosol container 14 whereby the closing of the passage 38 by the shell 12 occurs prior to any downward movement of the valve stem 20.

After the parts have attained the position shown in FIG. 2, whereby the metering chamber 34 is loaded with the pressurized aerosol substance, the finger pressure is removed from the shell 12 whereupon the springs 28 and 42 will return the parts to the FIG. 1 position. For such position, the metering chamber 34 will have communication with the outside atmosphere, and the pressurized contents of the metering chamber will thus issue from the passage 38 and from the discharge opening 48 as a spray or metered discharge.

In accordance with the invention, the actuator button is so constituted that by a slight adjustment or setting it may be utilized to obtain a non-metering or continuous discharge of the aerosol substance. For this purpose, the side wall of the shell 12 is provided with a second discharge opening 58 in its upper side wall portion and there is also provided a vertical slot 60 in the lower side wall portion of the shell, disposed vertically below the second discharge opening 58.

The arrangement of the inturned detent shoulder 50 of the shell 12 and the cooperable shoulder 52 on the body portion 10 is such that a limited turning movement of the shell 12 on the body portion is possible, whereby the vertical slot 60 may be disposed directly over the finger piece 40, and the second discharge opening 58 disposed vertically above the mouth of the discharge passage 38. When the button is thus adjusted or set in this manner, the shell 12 is capable of having a greater relative downward movement on the body portion 10. Such greater movement will enable the second discharge opening 58 to be brought into registration with the discharge passage 38 upon finger pressure being exerted downward on the shell 12. This condition is depicted in FIG. 3. In this figure the continued downward finger pressure has also shifted downward the valve stem 20, opening the valve whereby a continuous discharge of the aerosol substance occurs, starting at the side opening 32 of the valve stem, proceeding upward through the metering chamber 34 and out through the horizontal discharge passage 38 and the discharge opening 58. With this position of the parts of the button a continuous discharge is effected as long as sufficient finger pressure is maintained downward on the actuator button.

By this invention, a simple detent means is provided to retain the shell 12 in either of the two adjusted or set positions, for effecting either the metering discharge or else the non-metering or continuous discharge, such detent means including vertical ribs 66 and 68 provided in the resilient shell 12. These ribs also provide the added function of enabling the side wall of the shell to have a yielding spring action and to snugly engage the side wall of the body portion 10 which contains the discharge passage 38, thereby to prevent undesired leakage of aerosol substance between the slideable parts when the passage 38 is closed off as in FIG. 2.

Continuing with explanation of the detent means, and referring to FIGS. 4–6 the body portion 10 is provided with a pair of oppositely disposed vertically extending very shallow or low beads or shoulders 64 adapted to cooperate with the oppositely disposed pairs of relatively deep ribs or beads 66, 68 of the shell. As seen in FIGS. 4–6, the shoulders or beads 64 may occupy part of the spaces within the beads 66 of the shell 12. And, considering these figures, if the shell 12 is rotated counterclockwise with respect to the body portion 10 the beads 64 may be made to occupy portions of the space within the ribs 68 of the shell 12. Such relative turning movement of the shell 12 on the body portion 10 is permitted because of outward yielding of the shell walls located between the ribs 66, 68 and is further permitted by the discontinuity in the inturned shoulder 50 at the bottom edge of the shell, but any movement beyond that described above is prevented by such inturned shoulder 50, as may be readily understood. In making this setting, the finger piece 40 is grasped, as well as the ribs 66, 68. When the low detent beads 64 are occupying the space within the ribs 68, the second discharge opening 58 of the shell will be disposed vertically above the finger piece 40, whereas for the relative positions of the parts shown in FIGS. 4, 5 and 6 the first discharge opening 48 is located above the finger piece 40.

The relatively great depths of the vertical ribs 66, 68 of the shell 12 provide a convenient finger grip, in conjunction with the finger piece 40 of the body portion 10 whereby the above relative turning movement may be easily effected, to set the button for either a metering discharge or else a non-metering or continuous discharge.

As seen in FIG. 8, arrows 70, 72 may be provided on the top of the shell 12, associated with the designations "contin." and "meter'g." The arrows 70, 72 may thus be referred to the arrow 43 on the finger piece 40, to apprise a user as to the adjusted or set position of the actuator button.

The present improved metering aerosol button construction as provided by the invention distinguishes from prior metering button constructions in that the discharge passage 38 is always in communication with the metering chamber 34, and is never closed off from the metering chamber. The closure is effected instead at the outer end of the discharge passage 38 by the slide valve constituted of the shell 12, whereas in prior metering type aerosol buttons a closure is effected between the discharge passage and the metering chamber. With these prior constructions, the aerosol substance must first fill the discharge passage before it is discharged to the atmosphere, whereas in the present construction the discharge passage is always filled with aerosol substance and ready to discharge after the charging operation as illustrated in FIG. 2.

It will thus be seen from the foregoing that I have provided an improved and simplified aerosol actuator button having relatively few parts, which button is of especially simple construction and provides for both a metering or non-metering or continuous type of discharge from the aerosol container. The button may be easily set to effect either the metering or the non-metering discharge, and has easily understood indications indicating the adjustment or setting. The actuator button is characterized by a foolproof slide type metering and discharge valve comprising the button portion having the discharge passage 38 and the cooperable side wall of the shell 12 having the discharge opening 48, as seen in FIG. 2. By virtue of the resilient construction of the shell 12 and the provision of the relatively deep vertical ribs 66, 68 a continuous pressure may exist between the side wall of the shell and the cooperable button portion having the discharge passage 38 whereby an effective closure of the discharge passage may be had without requiring large frictional forces. Instead, the shell 12 may have an easy movement of the body portion 10. Due to the soft action of the spring 42, the shell 12 will always first shift downward on the body portion 10 before any downward movement of the valve stem 20 occurs. In consequence a foolproof metering action is had at all times. The size of the metering chamber 34 may be varied to obtain different metered quantities of the aerosol substance, as will be readily understood.

Referring to the modification of FIGS. 9 and 10, in accordance with the invention, the shell 12a is so arranged that the valving side wall portion is independently movable with respect to the remainder of the side wall, and is biased inward to provide additional pressure against the mouth of the discharge passage 38 of the body portion 10a. This is clearly shown in FIG. 9, wherein the side wall at the discharge opening 48a has a pair of vertically extending slots 76 providing an independently movable valving tab 75. The tab 75 constitutes the closure for the discharge passage 38 in a manner similar to that shown in FIG. 2, at the time that the metering button is being depressed. By virtue of the slotted construction which forms the tab 75, the latter may have an inward bias by which it firmly presses against and seals off the mouth of the passage 38, without involving any appreciable binding of the shell 12a on the body portion 10a. Thus, a tight valve action and closure is obtainable while at the same time the shell 12a is sufficiently freely movable on the body portion 10a against the action of the spring 42 to effect the closure of the valve means 75, 38 prior to any downward movement of the valve stem 22a being experienced. As already mentioned above, the valve spring is stronger or stiffer than the shell return spring and combined frictional forces existing between the shell 12a and body portion 10a, thereby to always insure a sequential operation at all times, whereby movement of the shell 12a on the body portion 10a occurs prior to any downward opening movement of the valve stem 22a.

In FIGS. 9, 10 and 11, parts which are similar to those already described in connection with the embodiment of FIGS. 1–8 generally have been given similar numbers but with the prefix "a" appended.

The shell 12a shown in FIGS. 9–11 may be advantageously fabricated either of metal or of plastic substance, so as to have an appreciable degree of resilience. As seen in FIG. 9, the discharge opening 48a which is adapted to align with the horizontal discharge passage of the body portion 10a is made rectangular, and its upper edge is defined by the depending tab 75 which is formed by the two vertical slots 76 in the side wall of the shell 12a.

The invention also provides a force transmission whereby the valve tab 75 has its force increased by the finger force applied. Extending along the outside of the tab 75, which constitutes the slide valve component adapted to close the discharge passage in the body portion 10a, is a depending resilient arm 78 carried by a finger engageable top plate 80 of generally circular configuration, said plate having an anchorage lug 82 affixed to the top wall 44a of the shell 12a. By such mounting, the finger plate 80 can fulcrum or swing downward about the mounting lug 82 at the time that finger pressure is applied to the button to effect a discharge. Such downward swinging or arcuate movement of the plate 80 in a counterclockwise direction as viewed in FIG. 10, will cause the depending arm 78 thereof to swing or press firmly against the valve closure member or tab 75 of the shell 12a. The greater the downward pressure which is applied to the finger plate 80, the more strongly will the arm 78 press against the tab 75, thereby insuring against leakage of the aerosol substance at the time that the button is being held downward (which is the time when the metering chamber in the body portion 10a is being charged). Thus, the construction of FIGS. 9–11 employs a different action from that of FIGS. 1–8, in insuring against leakage of the aerosol substance through the slide valve when the latter is closed.

Yet another embodiment of the invention is illustrated in FIGS. 12 and 13, wherein a still different type of construction embodying a sealing function of finger pressure is provided to effect a leakproof closure of the lateral discharge passage. As seen in these figures, the body portion 10b having the lateral discharge passage 38b is provided with a vertically extending flat-bottomed groove 86 having a sloping wall 88 at the place where the discharge passage 38b opens into the atmosphere. The shell 12b has a vertically extending indented portion 90 provided with a sloping valve closure portion 92 which is adapted to engage the sloping wall 88 of the body portion 10b at the time that the button is being depressed to the loading position.

It will be understood that with such construction, a greater finger pressure at the top of the shell 12b will effect a greater pressure of the valve portion 92 of the shell against the cooperable sloping face 88 of the body portion 10b, thereby resulting in less likelihood of leakage past the valve at the time of charging of the metering chamber 34b.

The body portion 10b has a second vertically extending flat-bottomed slot 96 to accommodate the inwardly offset portion 90 of the shell 12b at the time that the latter is rotated with respect to the body portion 10b for the purpose of setting the button in the non-metering or continuous discharge position. The slot 96 provides clearance for the portion 90 of the shell, and the second discharge opening 98 of the shell 12b is made sufficiently large to prevent its interfering with the spray discharge from the passage 38b even though the mouth of such passage is spaced inward a slight extent from the wall portions in which the second discharge opening 98 is disposed. The shell 12b has vertically extending ribs 66b and 68b, serving the same purpose as the ribs 66 and 68 of FIGS. 1–8 whereby the wall 90, 92 has a yielding spring action. Because of the slope there still remains a slight slide action, wherein the pressure is increased as finger pressure increases.

Variations and modifications may be made within the scope of the claims, and portions of the improvement may be used without others.

I claim:
1. A metering actuator button for an aerosol dispensing device of the type having a projecting hollow depressible valve stem, comprising in combination:
   (a) a body portion having a discharge passage with an exposed mouth and a bore communicating with the passage and adapted to frictionally receive said valve stem for mounting the body portion thereon,
   (b) a finger-operable valve part comprising a cover member movably mounted on said body portion and having a discharge opening, said part being movable between a first shifted position wherein the discharge opening registers with the mouth of the discharge passage and a second shifted position wherein it is out of registration with said mouth, said part respectively uncovering and covering said mouth for said first and second positions,
   (c) spring means biasing said valve part to the said first position,
   (d) said valve part having a finger engageable surface disposed so as to face in a direction which is opposite to the direction in which the stem-receiving bore of the body portion faces whereby pressure on said surfaces will shift the body portion in a direction to depress the valve stem,
   (e) said valve part being constructed to shift on said body portion to its second position in response to said finger pressure,
   (f) said valve part comprising a thin-walled resilient inverted cup vertically slidable on the body portion between raised and lowered positions corresponding respectively to said first and second positions, said cup having a yieldable side wall which has a yielding spring action and which has an opening constituting the discharge opening which registers with the mouth of the discharge passage when the cup is in raised position,
   (g) said yieldable side wall being displaceable radially outward a minute amount and normally remaining in intimate contact with the body portion.

2. A metering actuator button as in claim 1, wherein:
   (a) the body portion has vertical guide ribs, and
   (b) the cup has deep vertical rib formations on opposite sides of and appreciably spaced from the side opening,
   (c) said rib formations receiving the guide ribs to restrict turning movement of the cup and enabling that portion of the cup wall which has the side opening to have a yielding spring action.

3. A metering actuator button as in claim 2, wherein:
   (a) the body portion has ribs disposed on its opposite sides,
   (b) the cup has oppositely disposed pairs of spaced groove formations either groove of which can receive a rib whereby the cup can occupy either of two positions on the body portion,
   (c) said side opening experiencing said registration for only one of said two rotative positions,
   (d) said cup having an additional side opening which is registerable with the discharge passage for the other of said two rotative positions and when the cup is in the said second shifted position,
   (e) said cup having another covering portion to cover the passage mouth for said other rotative position and said first shifted position.

4. A metering actuator button as in claim 3, wherein:
   (a) the body portion has a fingerpiece projecting beyond the cup,
   (b) said rib formations and fingerpiece constituting finger grips to facilitate setting movement of the cup on the body portion.

5. A metering actuator button as in claim 4, wherein:
   (a) said fingerpiece is aligned with the mouth of the discharge passage and has an arrow designation to indicate the direction of the spray.

6. A metering actuator button as in claim 3, wherein:
   (a) the body portion has a narrow fingerpiece projecting laterally beyond the cup and engageable with an edge of the cup when the latter is in the lowered position to constitute a stop therefor,
   (b) the cup is provided with a notch in its edge, to clear the fingerpiece for the said other rotative position of the cup.

7. A metering actuator button as in claim 3, wherein:
   (a) the body portion has a discontinuous circular circumferential detent shoulder, and
   (b) the cup has an inturned bottom edge engageable with the detent shoulder to prevent removal of the cup,
   (c) said inturned edge enabling the cup to have limited rotative movement between the said two rotative positions.

8. A metering actuator button as in claim 1, wherein:
   (a) force-transmission means are provided, for effecting a pressure of the yieldable side wall against the mouth of the discharge passage as finger pressure is increased on the said finger-engageable surface.

9. A metering actuator button as in claim 8, wherein:
   (a) the body portion has a sloping surface surrounding the mouth of the discharge passage,
   (b) the force-transmission means comprises a sloping wall portion of the valve part.

10. A metering actuator button as in claim 8, wherein:
    (a) the force-transmission means comprises a fingerpiece on the valve part, having said finger-enageable surface, said fingerpiece being movable with respect to the valve part and shifting in a direction toward the latter in response to finger pressure thereon.

11. A metering actuator button for an aerosol dispensing device of the type having a projecting hollow depressible valve stem, comprising in combination:
    (a) a body portion having a discharge passage with an exposed mouth and a bore communicating with the passage and adapted to frictionally receive said valve stem for mounting the body portion thereon, (b) a finger-operable valve part movably mounted on said body portion and movable between a first shifted position wherein it uncovers the mouth of the discharge passage and a second shifted position wherein it covers said mouth, (c) spring means biasing said valve part to said second position, (d) said valve part having a finger-engageable surface disposed so as to face in a direction which is opposite to the direction in which the stem receiving bore of the body portion faces whereby pressure on said surface will shift the body portion in a direction to depress the valve stem, (e) said valve part being constructed to shift on said body portion to its first position in response to said finger pressure.

12. A metering actuator button as in claim 11, wherein:

(a) the valve part comprises an inverted cup vertically slidable on the body portion between lowered and raised positions corresponding respectively to said first and second positions, said cup having a side opening which registers with the mouth of the discharge passage when the cup is in lowered position.

References Cited by the Examiner

UNITED STATES PATENTS

| | | | |
|---|---|---|---|
| 848,419 | 3/1907 | Webster | 222—514 |
| 2,892,576 | 6/1959 | Ward. | |
| 2,989,217 | 6/1961 | Focht. | |
| 3,138,301 | 6/1964 | Ward. | |
| 3,180,536 | 4/1965 | Meshberg | 222—394 |
| 3,191,817 | 6/1965 | Furutani | 222—394 |

ROBERT B. REEVES, *Primary Examiner.*